United States Patent [19]

Colovas et al.

[11] 3,788,233

[45] Jan. 29, 1974

[54] GUIDED TRANSPORTATION SYSTEM

[75] Inventors: Denny D. Colovas; John S. Logan; Richard R. Skruch, all of Dearborn, Mich.

[73] Assignee: Ford Motor Company, Dearborn, Mich.

[22] Filed: Aug. 5, 1971

[21] Appl. No.: 169,396

[52] U.S. Cl. ............... 104/88, 104/23 FS, 104/247
[51] Int. Cl. .............................................. B61j 3/00
[58] Field of Search .......... 104/23 FS, 88, 130, 247

[56] References Cited
UNITED STATES PATENTS

| | | | |
|---|---|---|---|
| 3,368,496 | 2/1968 | Falk et al. | 104/23 FS |
| 3,643,600 | 2/1972 | Bertin | 104/23 FS |
| 3,098,454 | 7/1963 | Maestrelli | 104/130 |
| 3,369,497 | 2/1968 | Driver et al. | 104/23 FS |
| 3,593,665 | 7/1971 | Marty | 104/130 |

Primary Examiner—Robert G. Sheridan
Assistant Examiner—Lawrence J. Oresky
Attorney, Agent, or Firm—William E. Johnson & Keith L. Zerschling

[57] ABSTRACT

A guided transportation system is disclosed. This system comprises three basic elements. A first element is a substantially flat roadway. A second element is a guided vehicle which includes normal vehicle wheels as well as a plurality of aligning wheels mounted in a horizontal position in a space between the bottom of the vehicle and the roadway. These aligning wheels are located so that at least a portion of each wheel extends outwardly toward an associated side of the vehicle a distance greater than an associated one of the wheels supporting the vehicle. The guidable vehicle also includes at least a pair of switch wheels mounted for movement on opposite sides of the vehicle. These switch wheels are movable individually from a switching position to an inactive position. The third element of the system is a pair of sidewall assemblies which extend along the length of opposite edges of the roadway. Each of the sidewall assemblies includes a plurality of vertical supporting portions and an aligning wheel engageable surface mounted on the portions which functions to guide the vehicle along the roadway when contacted by the aligning wheels. Each sidewall assembly also has along at least the portions thereof associated with vehicle switches for the roadway, a switch wheel engageable surface which may be engaged by one of the switch wheels when in its switching position to guide the vehicle along a particular path through a switch.

5 Claims, 2 Drawing Figures

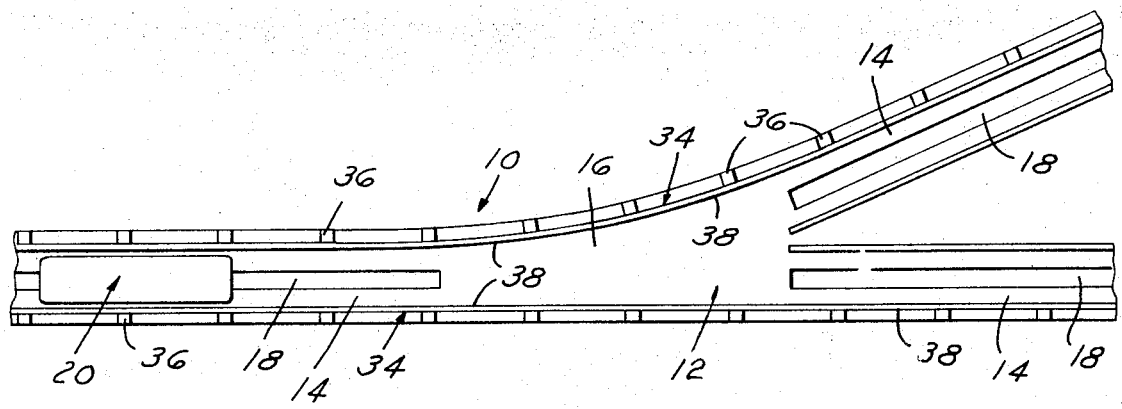
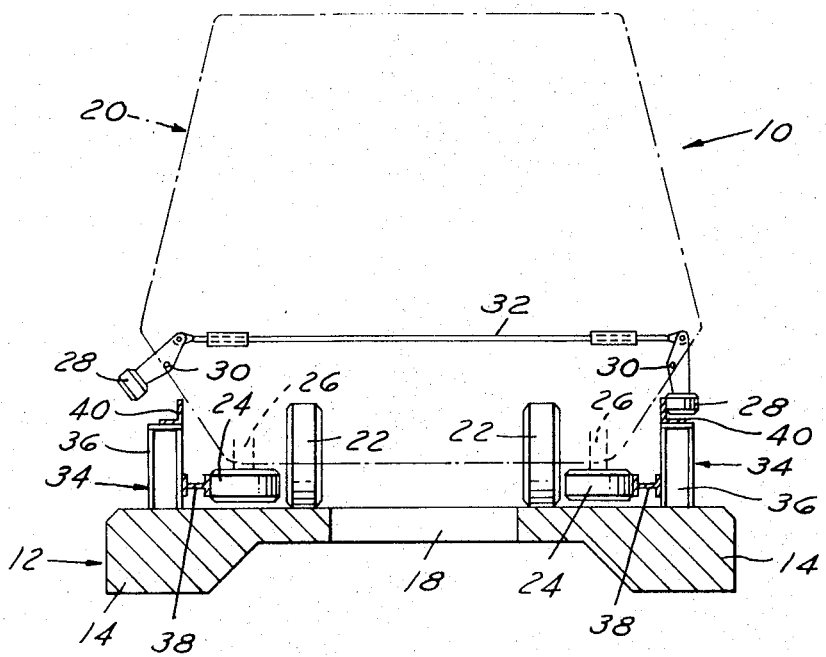

3,788,233

GUIDED TRANSPORTATION SYSTEM

BACKGROUND OF THE INVENTION

The prior art has taught many different transportation vehicles which may be guided along predetermined paths. Examples of such devices are railroad and subway vehicles which are guided along rails as the vehicle moves along a predetermined path. The railroad or subway vehicle is moved from one path of travel to another path of travel by intricate switching mechanisms. Generally these switching mechanisms require the shifting of track elements in order to direct the vehicle onto a different path of travel.

Switching systems are also known for pneumatic tired vehicles. These systems generally function in a manner similar to the switching systems for track type vehicles. For example, U.S. Pat. No. 3,098,454, issued July 23, 1963, teaches a switching structure wherein movable guide elements are employed to switch the pneumatic tired vehicle from one path to another path. Once again, the disadvantage of the type of transportation system shown in this patent is that guide elements must be switched to switch a vehicle. The apparatus for switching such guide elements is extremely expensive and very intricate in operation.

It is a general purpose of the transportation system of this invention to eliminate some of the difficulties found in prior art type guided transportation systems. More particularly, it is a principal purpose of this invention to eliminate the switching of guided vehicles by the movement of guide track portions or guide element portions which require intricate and costly switching apparatus.

SUMMARY OF THE INVENTION

This invention is directed to a guided transportation system and, more particularly, to a guided transportation system in which the transportation vehicle is supported by a plurality of pneumatic tires.

In accordance with the general teachings of this invention, a guided transportation system includes three basic elements. The first element of the system is a substantially flat roadway, the roadway having both single direction portions and switching portions along its length.

A second element of the system is a guidable vehicle which moves along the roadway. The vehicle includes a plurality of pneumatic tires rotatably secured to the vehicle for supporting the vehicle a fixed distance above the roadway and for permitting movement of the vehicle along the roadway. The vehicle also has a plurality of aligning wheels which are mounted in a horizontal position in a space between the bottom of the vehicle and the roadway. The aligning wheels are located so that at least a portion of each wheel extends outwardly towards an associated side of the vehicle a distance greater than an associated one of the pneumatic tires supporting the vehicle. The vehicle also has at least a pair of switch wheels which are mounted on opposite sides of the vehicle. The switch wheels are movable between a switching position wherein an individual wheel is horizontally located at a position spaced outwardly from and above an associated one of the aligning wheels to an inactive position displaced from the switching position.

The third element of the guided transportation system is a pair of sidewall assemblies extending along the length of opposite edge portions of the roadway. The sidewall assemblies include vertical supporting portions. The sidewall assemblies also include an aligning wheel engageable surface secured to the supporting portions and extending along the length of the roadway at a position spaced a fixed distance above the roadway. This aligning wheel engageable surface provides a continuous, flat surface over which the aligning wheels of the guidable vehicle may move to locate the vehicle properly in the roadway. The sidewall assemblies also include switch wheel engageable surfaces secured to the upper portion of the supporting portions. These switch wheel engageable surfaces extend along the length of at least switching portions of the roadway and provide a continuous, flat surface which may be engaged by one of the switch wheels as the vehicle is being switched while passing over a switching portion of the roadway.

In more extensive detail, the guided transportation system of this invention has the substantially flat roadway constructed in the following manner. A pair of laterally spaced roadbed elements are used to define the roadway in locations where the guidable vehicle is moving along in a single direction. A solid roadbed element is used to define the roadway at locations where the vehicle is switched from one path of movement to movement along either one of two other paths. The solid roadbed element permits the pneumatic tires supporting the vehicle to move smoothly through the switch regardless of the new path selected for vehicle travel.

Additional details of the guided transportation system of this invention will appear during the more detailed description of this invention which follows.

BRIEF DESCRIPTION OF THE DRAWING

FIG. 1 is an elevational view, partly in cross section and partly in phantom, showing the details of the various elements of the guided transportation system of this invention at the beginning of a switching portion of the system.

FIG. 2 is a plan view of the roadway utilized with the guided transportation system of this invention which shows, in detail, some single direction portions and a switching portion of the roadway.

DESCRIPTION OF THE PREFERRED EMBODIMENT

Reference is made to FIG. 1 which shows the guided transportation system of this invention, generally identified by the numeral 10. The system includes a roadway, generally identified by the numeral 12. The roadway includes (See FIG. 2) both single direction portions 14 and a switching portion 16 therealong. As shown best in FIG. 1, the single direction portions 14 of the roadway 12 are formed by a pair of laterally spaced roadbed elements having an opening 18 therebetween. The portions 14 may be formed from concrete, metal or the like.

A guidable vehicle, generally identified by the numeral 20, forms a second element of the transportation system 10. As seen best in FIG. 1, the vehicle has a plurality of vertically aligned pneumatic wheels 22 for supporting the vehicle a fixed distance above the roadway and for permitting movement of the vehicle along the roadway. These pneumatic wheels are supported from the vehicle in a normal manner by means (not shown) of standard construction.

A plurality of aligning wheels 24 are rotatably supported by rotatable mounting structures 26 at the corners of the guidable vehicle 20. These aligning wheels are located in a horizontal position in a space between the bottom of the vehicle and the top surface of the roadway 12. Also, these wheels are so located that they extend outwardly toward the side of the vehicle a distance greater than the pneumatic wheels 22. As shown in FIG. 1, the aligning wheels are between the wheels 22 and the side of the vehicle.

A pair of switch wheels 28 are pivotably mounted to the vehicle 20 for movement about pivot pins 30. As seen in FIG. 1, the right switch wheel 28 is located in a switching position wherein the individual wheel is horizontally located at a position outwardly from and above an associated one of the aligning wheels 24 on the right hand side of the vehicle. The left hand switching wheel 28 of the vehicle is in an inactive position displaced outwardly and upwardly from its switching position. An operating lever bar 32 interconnects opposite ends of the structure supporting the wheels 28. This lever bar is of such a length that when the right wheel is in a switching position the left wheel is in an inactive position and vice versa. The right or left wheel is lowered to its switching position by simply moving the operating lever bar to the right or to the left as desired. If desired, the switching wheels may be designed so as to be retractable from the switching position to the inactive position. Also, if the vehicle 20 is designed for bidirectional travel, switch wheels would be located at all four corners of the vehicle.

A pair of sidewall assemblies, generally designated by the numeral 34, are provided. As best seen in FIG. 2, the sidewall assemblies extend along the length of opposite edge portions of the roadway 12. The sidewall assemblies include a plurality of vertical supporting portions 36. These supporting portions are formed by I beams which extend upwardly from the roadbed 12 at positions spaced along the length thereof.

Each of the sidewall assemblies 34 has an aligning wheel engageable structure 38 formed therealong. This aligning wheel engageable structure is formed by an I beam which has its bottom, flat surface welded at spaced points to various ones of the vertical supporting portions 36. The flat, top surface of the aligning wheel engageable structure 38 defines a smooth surface which extends continuously along the length of the roadway. This surface is engageable by an associated aligning wheel 24 to aid in locating the guidable vehicle 20 in the roadway 12.

Each of the sidewall assemblies 34, as best seen in FIG. 1, also has a switch wheel engageable structure 40 formed by an L shaped channel. This L shaped channel has its bottom leg welded at spaced points along its length to the top of the vertical supporting portions 36. The upwardly extending leg of the L shaped channel provides a surface which may be engaged by the switching wheels 28 when in their switching positions. The switch engageable structure 40 is generally located along the roadway 12 at switching portions 16 thereof. In the single direction portions 14 of the roadway, there is no need to have the switch wheel engageable structures. If the switch wheels 28 are retractable to the inactive position, such retraction would be accomplished where no switch wheel engageable structure is present.

After describing the structure of the guided transportation system 10 of this invention to this point, the mode of operation of the guidable vehicle 20 transported over the roadway 12 is readily apparent. Reference is made to FIG. 2 to describe the switching of the vehicle. The vehicle 20 is shown in the FIG. 2 as it approaches the switching portion 16 of the roadway 12. If it is desired to continue the vehicle's progress along the roadway in the direction shown by the lower single direction portion 14, the switch wheel 28 on the lower side of the vehicle (as viewed in FIG. 2) is brought into engagement with the switch wheel engageable structure 40 on the lower side of the roadway. When the vehicle passes through the switching portion, the switch wheel keeps the vehicle in a direction of movement along the lower path. However, if it is desired to switch the vehicle in the direction represented in FIG. 2 as the upper path, the switch wheel on the upper side of the vehicle is brought into contact with its associated switch wheel engageable structure. Such engagement of the upper switch wheel causes movement of the vehicle onto the upper path as viewed in FIG. 2.

After reading this specification, many modifications of this invention which fall within the true spirit and scope thereof will be apparent to one skilled in the art. It is intended that all such modifications be included within the terms of the appended claims.

We claim:

1. A guided transportation system which comprises:
   A. a substantially flat roadway including both single direction portions and switching portions therealong;
   B. a guidable vehicle including:
      1. vertically aligned wheel means rotatably secured to said vehicle for supporting said vehicle a fixed distance above said roadway and for permitting movement of said vehicle along said roadway;
      2. a plurality of guiding wheels;
      3. support means for mounting said guiding wheels at the corners of said guidable vehicle, each of said wheels being mounted by said means in a horizontal position in a space between the bottom of said vehicle and said roadway so that at least a portion thereof extends outwardly toward the sides of said vehicle a distance greater than said wheel means;
      4. a pair of switch wheels;
      5. means for movably mounting said pair of switch wheels on opposite sides of said guidable vehicle, said switch wheels being movable between a switching position, wherein an individual wheel is horizontally located at a position outwardly from and above an associated one of said aligning wheels, and an inactive position displaced from said switching position;
      6. operating means for controlling said switching wheels so that only one of said switching wheels is in said switching position at the time;
   C. a pair of sidewall assemblies extending along the length of opposite sides of edge portions of said roadway, said sidewall assemblies including:
      1. vertical supporting portions;
      2. aligning wheel engageable means secured to said supporting portions of said pair of sidewall assemblies and extending along the length of said roadway at a position spaced a fixed distance above said roadway, said aligning wheel engageable means for providing a continuous, flat surface over which said aligning wheels may move to locate said guidable vehicle in said roadway;

3. switch wheel engageable means secured to the upper portion of said vertical supporting portions and extending along said roadway at least at said switching portions thereof at a position spaced a fixed distance upwardly from said aligning wheel engageable means, said switch engageable means for providing a continuous, flat surface between said switching wheel and said side of said vehicle which may be engaged by one of said switching wheels when in its switching position.

2. The guided transportation system of claim 1 wherein: said single direction portion of said roadway is defined by a pair of spaced apart roadbed elements, and wherein: said switching portion of said roadbed is defined by a solid roadbed element which permits said vertically aligned wheel means to move smoothly through said roadbed element when vehicle switching occurs.

3. The guided transportation system of claim 1 wherein: vertical supporting portions of said side wall assemblies are I beams extending upwardly from said roadbed at spaced positions along the length thereof.

4. The guided transportation system of claim 1 wherein: said aligning wheel engageable means is an I beam having its top, flat surface facing said aligning wheels for engagement thereby, and its bottom, flat surface secured at spaced points along its length to said vertical supporting portions of said sidewall assemblies.

5. The guided transportation system of claim 4 wherein: said switch wheel engageable means is an L shaped channel having its bottom leg secured at spaced points along its length to the tops of said vertical supporting portions of said sidewall assemblies, and having its upwardly extending leg providing said surface which may be engaged by said switching wheels.

* * * * *